United States Patent [19]

Miller et al.

[11] Patent Number: 4,813,277

[45] Date of Patent: Mar. 21, 1989

[54] METHOD FOR COLLECTING MAGNETIZABLE PARTICLES IN AN ABOVE GROUND STORAGE TANK

[75] Inventors: David C. Miller, Downers Grove; Arthur R. Brown, Warrenville, both of Ill.

[73] Assignee: Amoco Corporation, Chicago, Ill.

[21] Appl. No.: 158,299

[22] Filed: Feb. 19, 1988

Related U.S. Application Data

[63] Continuation-in-part of Ser. No. 31,546, Mar. 30, 1987, Pat. No. 4,736,622.

[51] Int. Cl.$^4$ .............................................. G01M 3/32
[52] U.S. Cl. ..................................... 73/49.2; 210/222; 210/695
[58] Field of Search ................ 73/49.2, 291, 293, 295, 73/304 R, 304 C; 340/605, 620, 622; 210/222, 695

[56] References Cited

U.S. PATENT DOCUMENTS 2,760,636  8/1956  Johnson .............................. 210/222

FOREIGN PATENT DOCUMENTS 53761  5/1976  Japan ................................... 210/695

Primary Examiner—Michael J. Tokar
Assistant Examiner—Joseph W. Roskos
Attorney, Agent, or Firm—Thomas W. Tolpin; William H. Magidson; Ralph C. Medhurst

[57] ABSTRACT

The method for detecing leaks in an above ground storage tank by sensing changes in conductivity along a line intersecting an interface between the liquid product in the tank and water in the tank with a leak detector includes the step of collecting magnetic metal contaminants to prevent magnetizable particles from fouling the sensing of changes of conductivity.

14 Claims, 7 Drawing Sheets

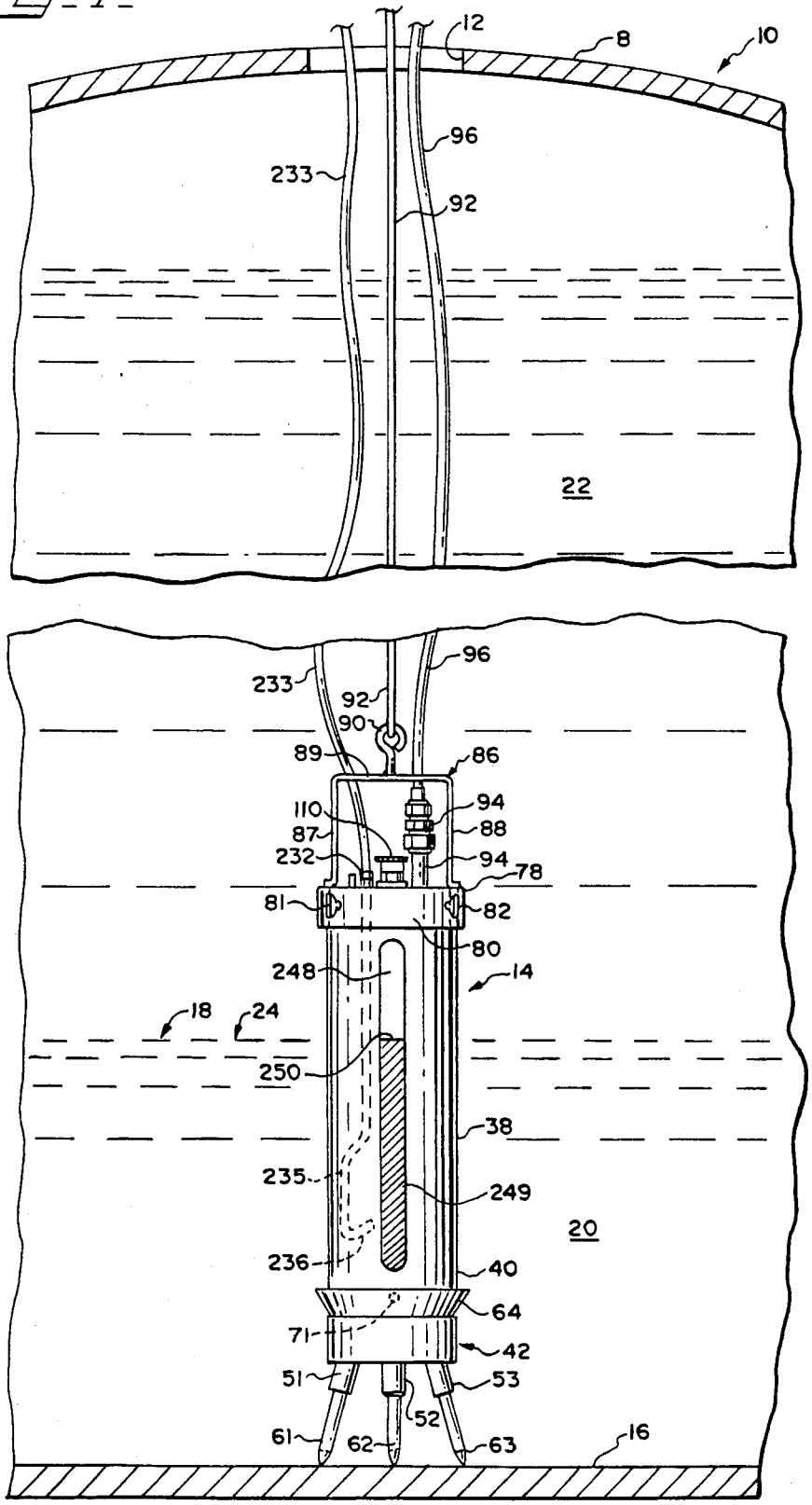

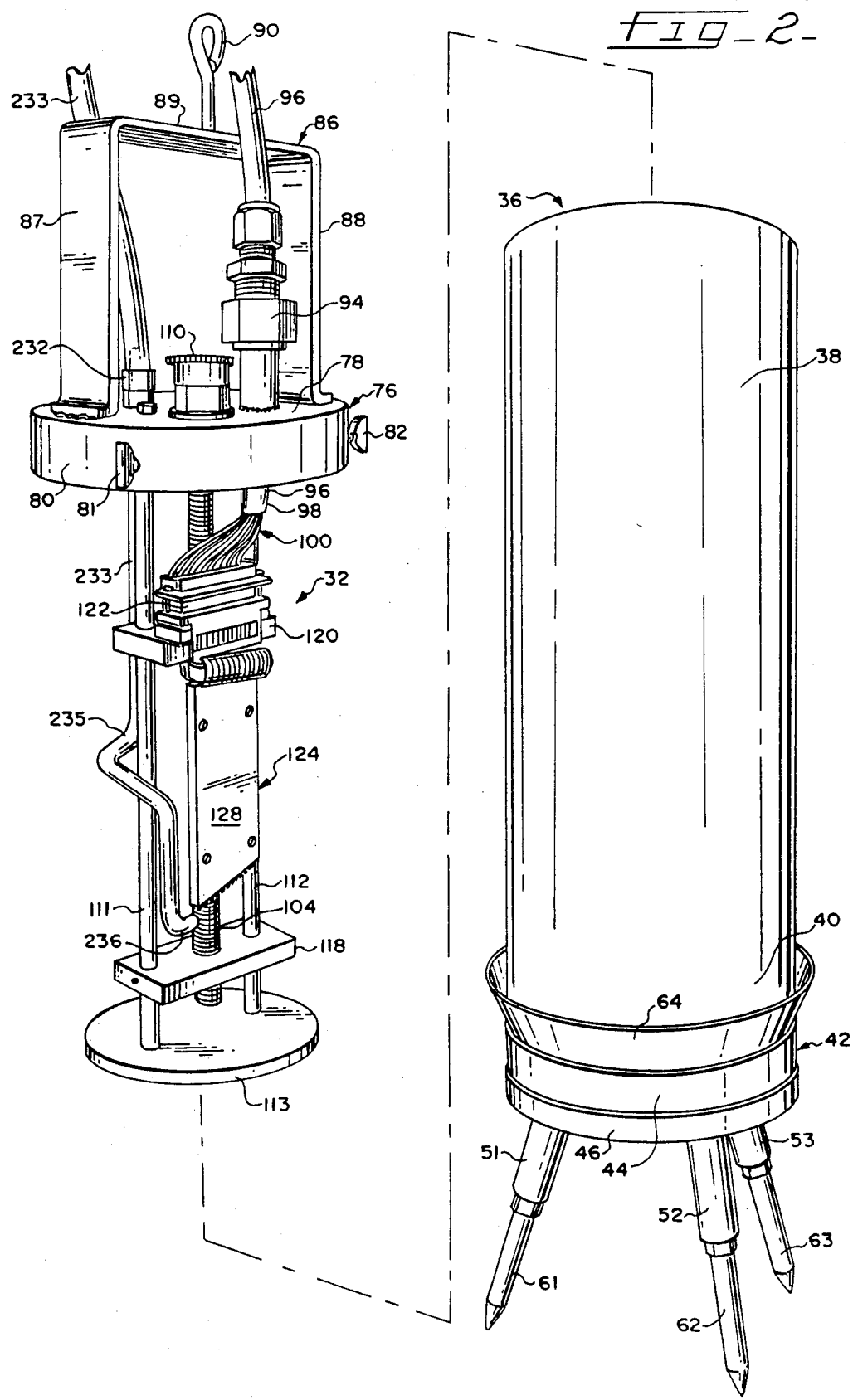
FIG-2-

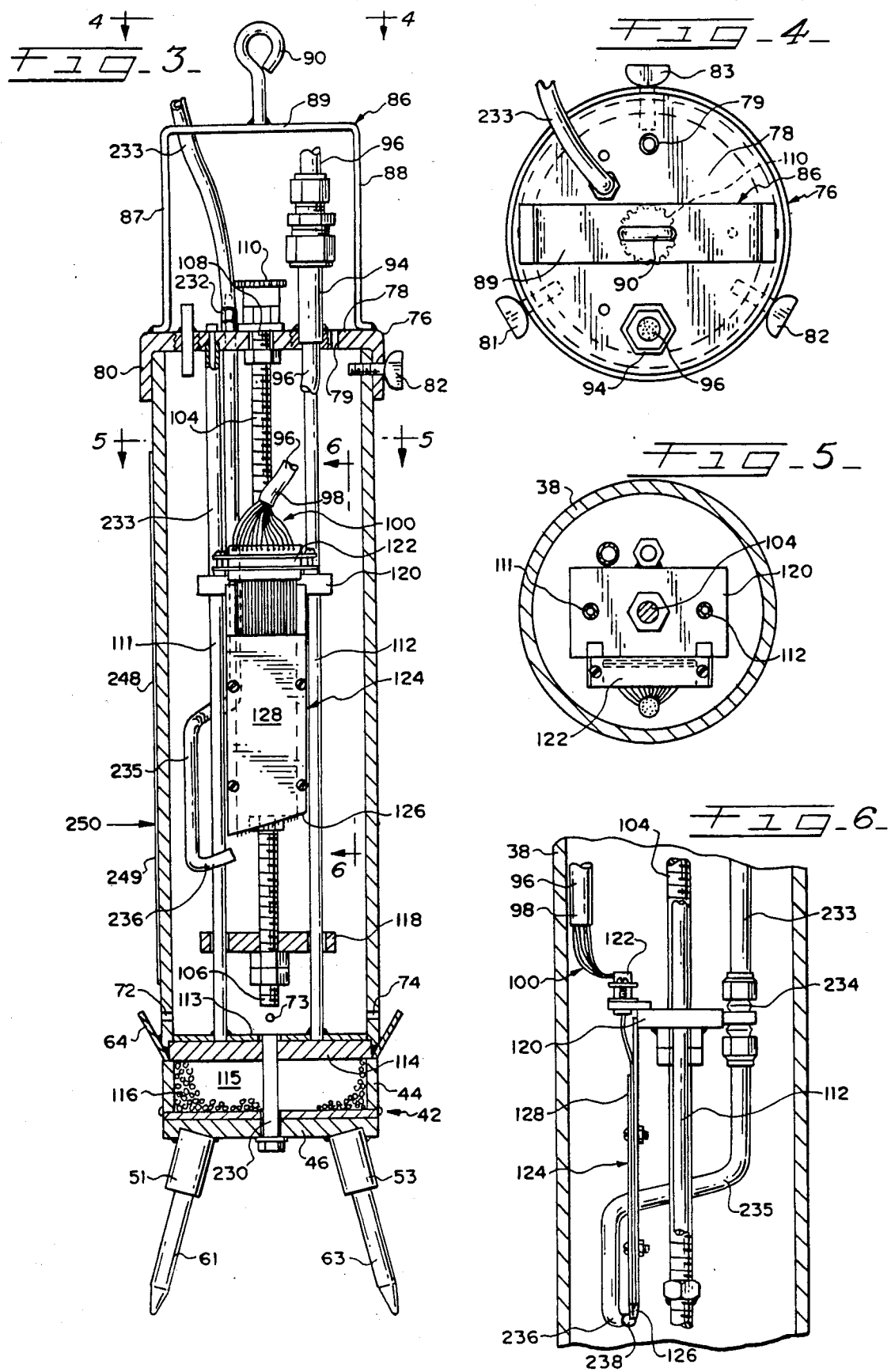

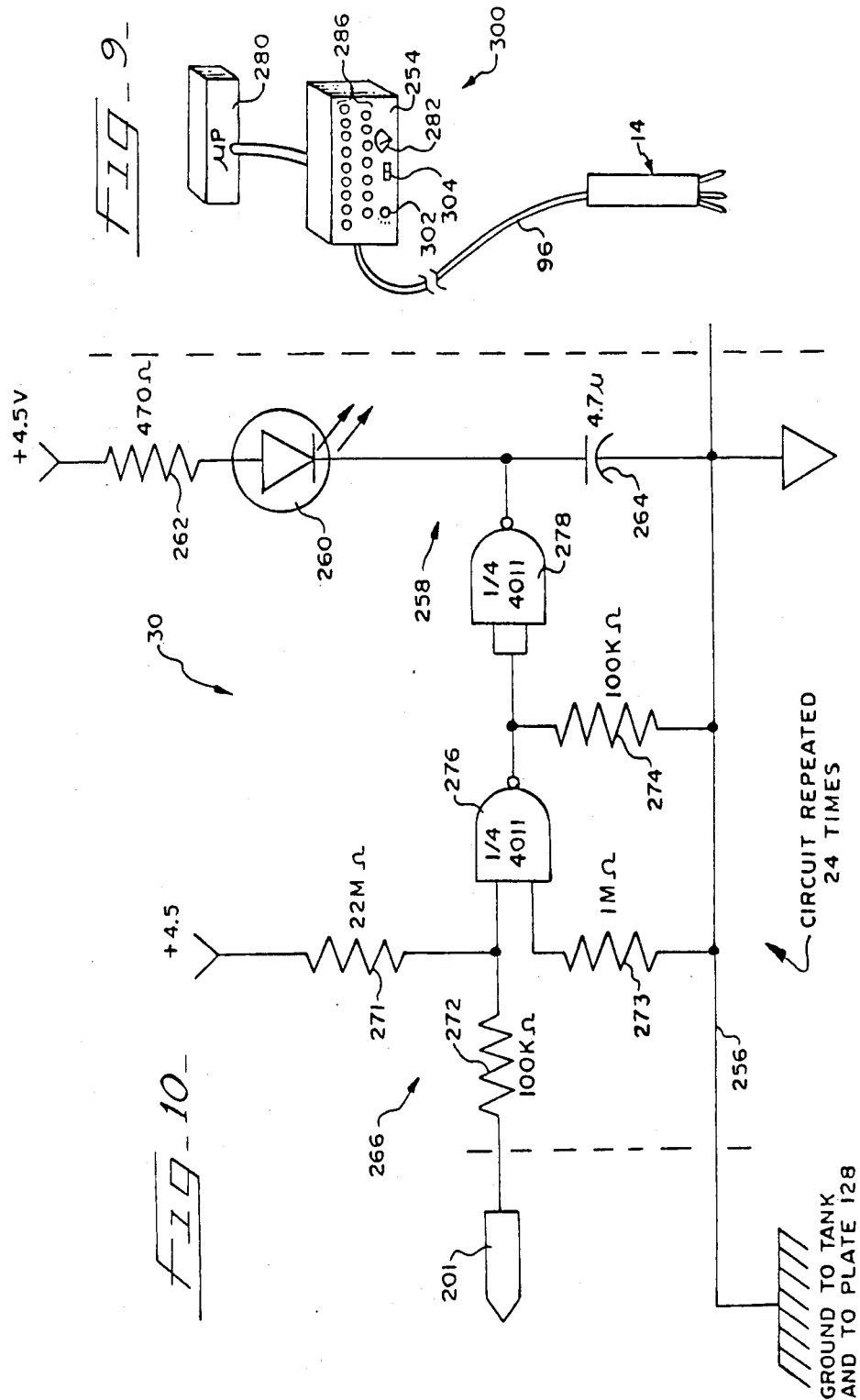

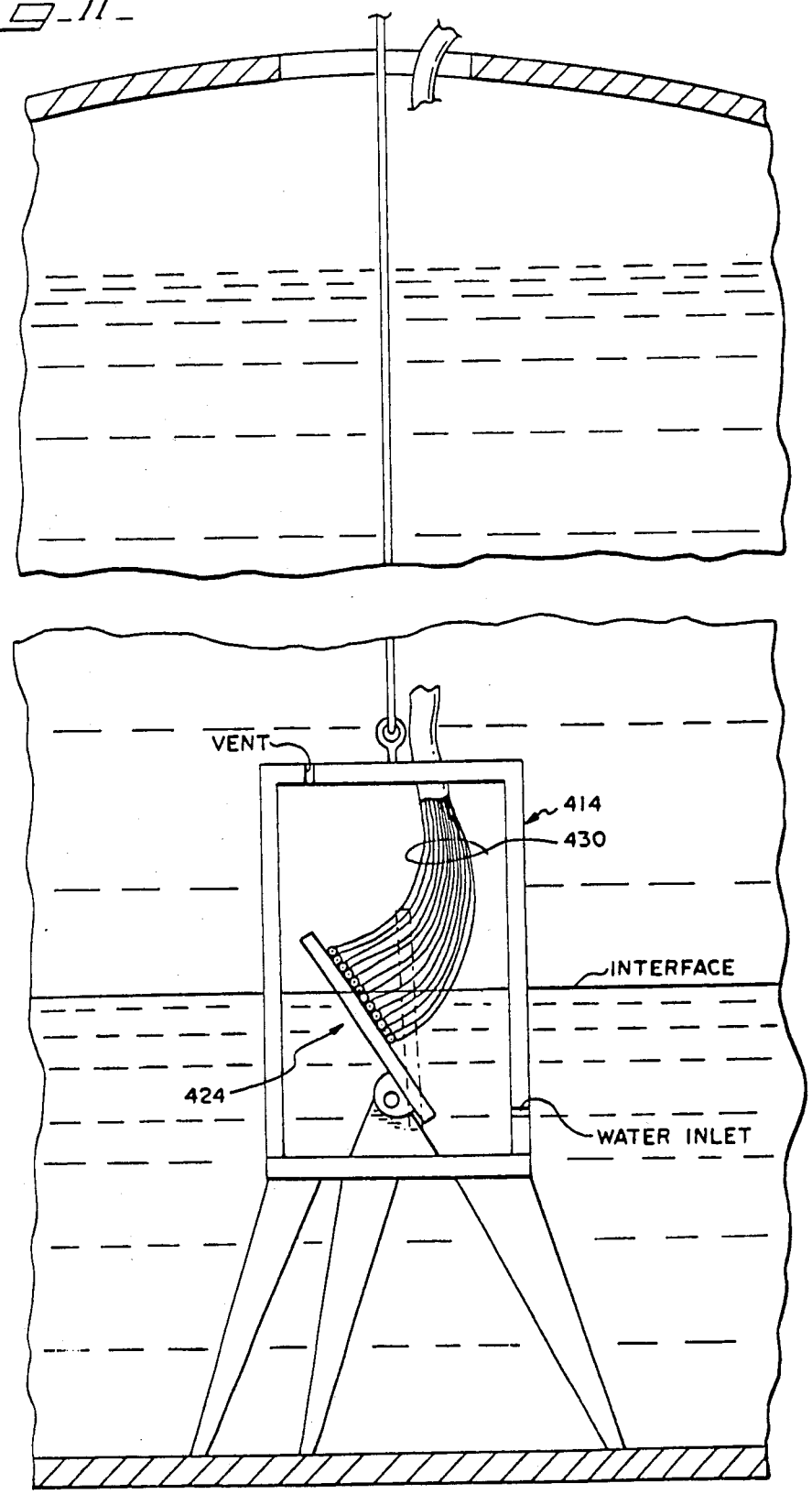
FIG_11

METHOD FOR COLLECTING MAGNETIZABLE PARTICLES IN AN ABOVE GROUND STORAGE TANK

This application is a continuation-in-part of U.S. Pat. No. 4,736,622, issued Apr. 12, 1988, Ser. No. 031,546 filed Mar. 30, 1987 of David C. Miller and Arthur R. Brown for a METHOD FOR DETECTING LEAKS IN AN ABOVE GROUND PETROLEUM STORAGE TANK.

BACKGROUND OF THE INVENTION

1. Field Of The Invention

The present invention relates to a method for collecting magnetizable particles located at the interface between a liquid product and water in an above ground storage tank. More specifically, the present invention relates to a method for collecting magnetic particles in the area of a petroleum-water interface in the storage tank where leaks are being detected by the sensing of changes in conductivity in a sensor assembly extending across the interface to prevent fouling of conductivity sensors of the sensor assembly with magnetizable particles.

2. Description of The Prior Art

Leaks in large above ground petroleum product storage tanks containing liquids such as regular gasoline, light fuel oil, diesel fuel and regular gasoline are a serious problem to the petrochemical industry from the standpoint of both inventory losses and environmental degradation.

The large size of such tanks makes leak detection difficult. In this respect, a leak rate of one barrel per hour in a 100 foot diameter tank will produce a level change rate of approximately 0.01 inches per hour and a direct measurement of the level change at the surface of the liquid in the tank is difficult due to the resolution required and to thermal expansion of the liquid, the tank and the detecting apparatus.

Furthermore, acoustic emission methods of leak detection previously utilized provide results which are clouded by the weakness of the leak as an acoustic source and by signal attenuation in the liquid or in the tank shell. Furthermore, background noise from wind and thermal expansion also appear to limit the reliability of leak detection determinations utilizing acoustic emissions.

Experience has shown that all significant leaks in above ground tanks occur in the area of the tank bottom. Also, experience has shown that thermal conditions near the bottom of the tank are stable. Furthermore, surface waves and convection currents in the liquid are effectively dampened by the time they reach the bottom of the tank.

A method for detecting leaks utilizes the environment adjacent the bottom of the tank for detecting leaks and the leak detector utilized in practicing this method is adapted to be positioned in the stable zone adjacent the bottom of the tank. With the method of the present invention, magnetizable particles at the interface between the liquid product in the tank and water in the tank are collected, preferably using a magnetic field established by magnets placed in the tank. This method can be practiced solely for the purpose of removing magnetizable particles from the interface between the liquid product and water in the tank and is preferably used in conjunction with the method for detecting leaks in the tank to prevent fouling of conductivity sensors of the leak detector situated in the tank.

SUMMARY OF THE INVENTION

According to the invention there is provided in a method for detecting leaks in an above ground storage tank by sensing changes in conductivity along a line intersecting an interface between the liquid product in the tank and water in the tank with a leak detector, the step of collecting magnetic metal contaminants to prevent magnetizable particles from fouling the sensing of changes of conductivity.

BRIEF DESCRIPTION OF THE DRAWINGS

FIG. 1 is a fragmentary vertical sectional view, with large portions broken away, of an above ground petroleum storage tank showing the leak detector of the present invention resting on the bottom of the tank.

FIG. 2 is an exploded perspective view of a cylindrical casing for the leak detector showing a sensor assembly separated from the cylindrical casing for housing the sensor assembly.

FIG. 3 is a vertical sectional view through the leak detector shown in FIG. 1.

FIG. 4 is a top plan view of the leak detector shown in FIG. 3 and is taken along line 4—4 of FIG. 3.

FIG. 5 is a horizontal sectional view of the leak detector shown in FIG. 3 and is taken along line 5—5 of FIG. 3.

FIG. 6 is a fragmentary vertical view of the leak detector shown in FIG. 3 and is taken along line 6—6 of FIG. 3.

FIG. 9 is a block, partially mechanical partially schematic drawing, not to scale, of one embodiment of the overall detecting system including the leak detector, a control panel with lamps and conductivity meter and an optional microprocessor.

FIG. 10 is a schematic circuit diagram of an electrical circuit that is mounted in the control panel shown in FIG. 9 and is connected to one sensor conductor in the sensor assembly shown in FIGS. 7 or 8.

FIG. 11 is a fragmentary vertical sectional view of an above ground storage tank, with major portions broken away, and shows a modified embodiment of the leak detector of the present invention resting on the bottom of the tank.

DESCRIPTION OF THE PREFERRED EMBODIMENT

Figure 8:
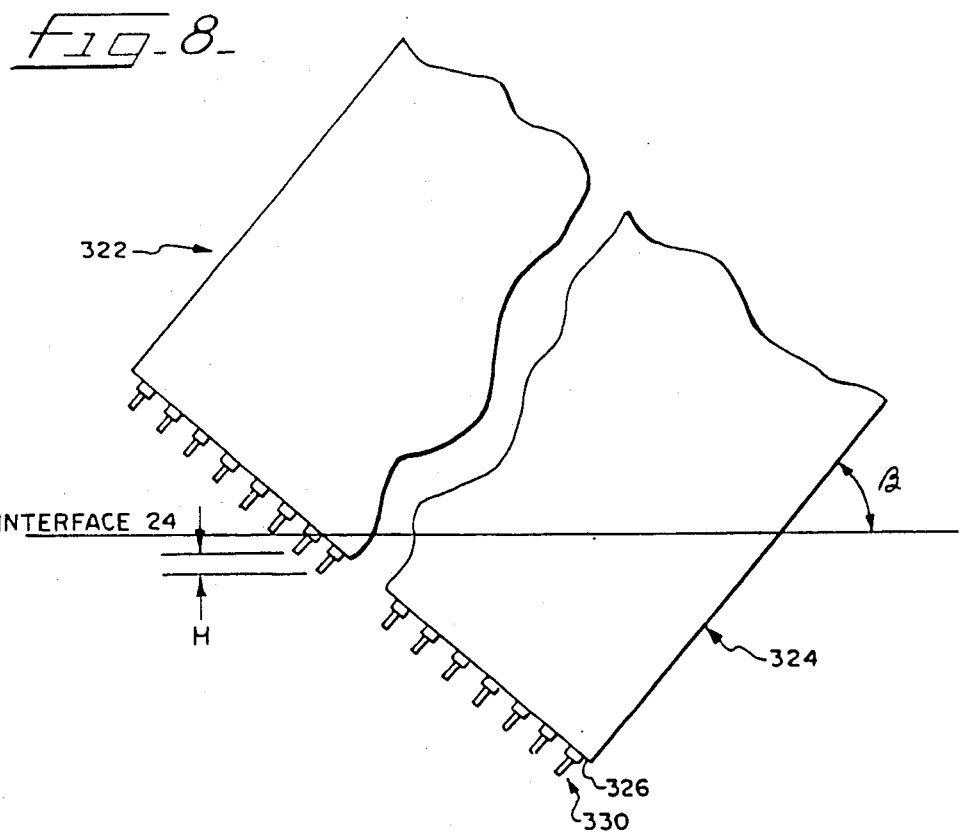
FIG. 8 is a vertical plan view of another embodiment of the sensor array shown in FIG. 7.

In FIG. 1 there is shown a fragmentary upper wall portion or top 8 of a petroleum storage tank 10 with an access hole 12 therein which is adapted to be sealed by a cap, and through which the leak detector 14 can be inserted for being lowered to the bottom or bottom wall 6 of the tank 10 and then utilized for checking for leaks and subsequently withdraws from the top 8 of the tank 10.

The leak detector 14 is shown resting on the bottom wall 16 of the tank 10.

Typically, in a petroleum storage tank 10 a small amount of moisture or water will accumulate on the bottom 16 of the tank 10, such as from condensation. However, in using the leak detector 14 a small amount of water is inserted into a tank 110 being tested for leaks sufficient to cover the bottom 16 of the tank 10. Also, experience has shown that if there is a leak in the tank 10, it usually is in the bottom wall 16 or in a lower end portion of the side wall (not shown) of the tank adjacent the bottom wall 16. Accordingly, when there is a leak, level 18 of a water layer 20 will tend to fall.

The hydrocarbon, petroleum or other petrochemical liquid 22 stored in the tank 10 typically has a low electrical conductivity (a resistivity of effectively infinite ohms—cm), while the water 20 at the bottom 16 of the tank 10 will typically have a much higher conductivity (a resistivity of 8-20 M$\Omega$—cm) as a result of the electrolytes therein. Also, at an interface 24 between the hydrocarbon liquid 22 which is situated above the water layer 20, there is a transition layer 24 which has a varying conductivity and which under certain conditions may be made up of a thin mat or layer 24 of debris that have somehow found their way into the tank 10 or have been formed therein.

As will be described in greater detail hereinafter, the leak detector 14, enables one to accurately determine the presence of a leak by determining changes in the water level 18, i.e., changes in the height of the interface 24 above the bottom 16 of the tank 10. This is determined by detecting changes in thermal or electrical conductivity or current flow in sensor circuits 30 (FIG. 10) for example coupled to a sensor assembly 32 (FIG. 2) located at the interface 24 between the upper liquid hydrocarbon 22 and the lower water layer 20.

The leak detector 14 will now be described below with reference to a sensor assembly 32 for sensing electrical conductivity after which a thermal sensor assembly 322 for sensing thermal conductivity will be described in connection with the description of FIG. 8.

As shown in FIG. 2, the leak detector 14 comprises the sensor assembly 32 which is received through an upper open end 36 of a cylindrical casing 38 having mounted at the lower end 40 thereof a base assembly 42. The base assembly 42 typically includes an annular ring member 44 having affixed therein a generally circular flat bottom plate or wall 46 (FIG. 3) which closes off the lower end 40 of the cylindrical casing 38. Mounted to the bottom wall 46 are three feet 51, 52, 53 which extend downwardly and which include threadably adjustably extendable, pointed prongs 61, 62 and 63 adapted to extend through any sludge at the bottom of the tank and rest on the bottom wall 16 of the tank 10.

The base assembly 42 also includes a skirt or flange 64, generally frustoconical in shape, which flares upwardly and radially outwardly from the annular ring member 44 and which extends in a vertical direction above four port openings 71–74 (FIGS. 1 and 3) in the lower end 40 of the cylindrical casing 38.

As best shown in FIGS. 2 and 3, the sensor assembly 32 extends downwardly through the open upper end 36 of the cylindrical casing 38 and is fixed at its upper end to a cap member 76 which includes a circular flat top portion 78 having at least one vent hole 79 (FIG. 3) and an annular portion 80 slightly larger in diameter than the diameter of the cylindrical casing 38. The cap member 76 is fixed to the cylindrical casing 38 by wing nuts 81–83 (FIG. 4).

Mounted to the top portion 78 of the cap member 76 is a generally inverted U-shaped bracket member 86 having two upstanding leg portions 87 and 88 and an upper bight portion 89 to which is affixed an eyelet 90 which in turn has a cable 92 (FIG. 1) connected thereto for raising and lowering the leak detector 14 out of and into the tank 10 of petroleum product (or liquid HC).

The top portion 78 also has an opening therethrough for receiving a tubular connector 94 which receives therethrough a multiconductor cable 96 which, at its lower end 98 has a plurality 100 of insulated wire conductors (typically 25) extending therefrom which extend to and are connected into the sensor assembly 32. The tubular connector 94 is of the type which will permit movement of the cable upwardly or downwardly into the cylindrical casing 38.

The sensor assembly 32 is mounted on a threaded rod 104 having a free lower end 106 and an upper end 108 which is journalled in the top portion 78 of the cap member 76 and which has a knob 110 at the upper end thereof for rotating the rod 104.

Also fixed to and extending downwardly from the top portion 78 are spaced apart guide rods 111 and 112 which extend on either side of the threaded rod 104 such that the two guide rods 111 and 112 (and the threaded rod 104 therebetween) lie generally in the same plane. The guide rods 111 and 112 are each fixed at their upper end to the top portion 78 of the cap member 76 and are each fixed at their lower ends to a circular plate 113 located adjacent a circular plate 114 of the base assembly 42.

A hollow space 115 is defined between the plates 46 and 114 for receiving a ballast material 116 such as lead shot or ball bearings.

Spaced slightly above the lower circular plate 113 is a guide block 118. The lower end of the threaded rod 104 is journalled in the guide block 118 which has two spaced apart openings therein for enabling the block 118 to be slidably received on the guide rods 111 and 112.

The sensor assembly 32 includes an upper block 120 which has two openings for slidably receiving the guide rods 111 and 112. It will be understood from FIGS. 2, 5 and 6 that the block 120 also has a central threaded opening through which the threaded rod 104 extends whereby rotation of the knob 110 to rotate the threaded rod 104 will cause raising or lowering of the block 120 on the guide rods 111 and 112.

Figure 7:
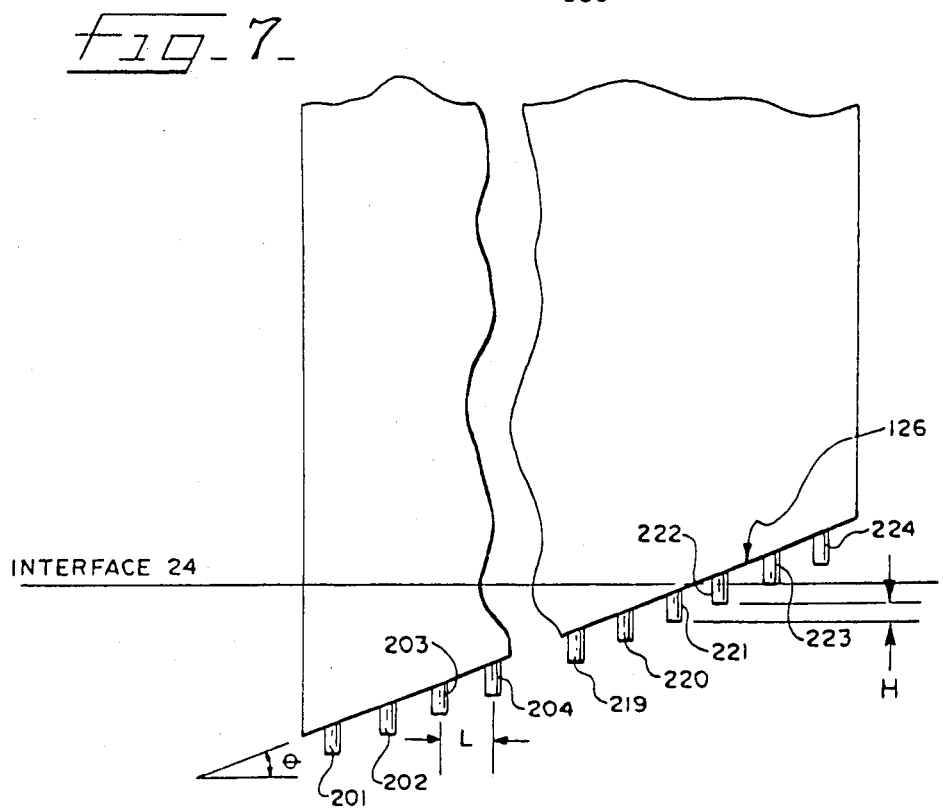
FIG. 7 is an enlarged vertical plan view with portions broken away of a sensor array of the sensor assembly shown in FIGS. 2 and 3.

The sensor assembly 32 further includes a cable connector block assembly 122 which is mounted on top of the upper block 120. Also mounted to the upper block 120 and extending downwardly therefrom is a sensor plate assembly 124 into which the multiple insulated conductors 100 extend and in which they are clamped in an equally spaced generally vertical parallel manner as shown in FIGS. 2, 3, 7 and 8. The lower edge of the plate assembly 124 has a bottom edge 126 which is inclined to the horizontal at a predetermined angle $\theta$ as shown in FIG. 7. The insulated wire conductors 100 are insulated from metallic parts of the plate assembly 124 which can be made of metallic conducting and/or nonmetallic nonconducting plate portions so long as the insulated wire conductors 100 are insulated from one another and from an outer metal plate 128 of the plate assembly 124 which serves as a ground (current return) element.

However, the lower ends of the wire conductors 100 such as wire conductor ends 201, 202, 203, 204 . . . 219, 220, 221, 222, 223, and 224 are bare, uninsulated, exposed end portions 201-224 spaced vertically above each other a predetermined distance H and horizontally a predetermined distance L from each other on the inclined bottom edge 126 of the plate assembly 124 as shown in FIG. 7 for providing an array of sensors (conductor end portions) 201-224 having a predetermined sensitivity as will be described in greater detail hereinafter.

The circular plates 46 and 114 are held to the circular plate 113 by a bolt 230 which extends through the center of the assembly 42.

Also mounted to the top portion 78 of the cap member 76 is a fitting 232 which receives a tubing 233 that extends through the cap member 76 to a coupling 234 (FIG. 6) mounted to the block 120 and connected to a tubing member 235 having a curved end portion 236 that is positioned so that an open end 238 thereof is aimed at and in line with the area adjacent to and parallel to the lower edge 126 of the sensor plate assembly 124. The tubing 233 is flexible and extends through the fitting 232 to the coupling 234 connected to the tubular member 235 to enable an operator to wash, scrub or flush off the array of sensors (bare conductor end portions) 201-224 periodically such as with the petroleum liquid in the tank 10.

In the use of the leak detector 14 (after a quantity of water is introduced into the tank 10 to cover the bottom 16), an operator will first lower the leak detector 14 through the hole 12 as shown in FIG. 1. The operator then will let the detector 14 settle through any sludge at the bottom 16 of the tank 10 until it is safe a common conductor 256 connected to the plate 128, a lamp circuit 258 including a lamp (LED) 260, a resistor 262 and a capacitor 264, and a signal processing circuit 266 including four resistors 271-274, a NAND gate 276 and an inverter 278.

In addition or as an alternative, the sensors or conductor ends 201-224 can be coupled to input ports of a microprocessor 280 (FIG. 9) which will note the conductivity or voltage levels on each of the conductors connected to each of the sensors (conductor ends) 201-224 and note the voltage levels at the respective input ports and what changes take place over a given period of time.

Another conductivity measuring alternative is a multi-position switch with an AC conductivity meter.

In this way, one can determine over a period of time whether there has been an increase in moisture or water in the tank 10 or whether there has been a leak by reason of a decrease of water in the tank 10.

Each of the circuits 30 provides a simple indication of the status of the water-petroleum liquid interface 24 and can be used in addition to or in place of a conductivity meter 282 on the control panel 254 shown in FIG. 9. The position of the interface layer 24 is indicated by a row or column 286 of twenty-four (24) light emitting diodes lamps 260, each one corresponding to and coupled to one of the sensor forming conductor end portions 201-224.

The LEDs 260 corresponding to the sensors immersed in the low conductivity hydrocarbon liquid 22 will flash on and off approximately twice per second. Those LEDs 260 associated with the water-contacting sensors 201-224 remain continuously energized. In this way, if the level of the interface 24 changes due to a leak, those ones of the LEDs 260 that were previously energized begin to flash on and off as the water level 18 in the tank 10 to assume that the detector 14 is resting on the bottom 16 of the tank 10. The detector 14 is allowed to rest in this position as shown in FIG. 1 for a short period of time after which it is raised out of the tank 10. A generally vertical layer of water sensing material 248 is provided on the exterior surface of the casing 38 as shown in FIG. 1. The portion 249 of the layer 248 situated in the water will change color to establish a water level line 250. Alternatively, a float type or optical sensor can be used to initially determine the water level line 250.

After the leak detector 14 is raised out of the tank 10, the operator will turn the knob 110 to adjust the position of the sensor assembly 32 so that the inclined lower edge 126 of the plate assembly 124 having the sensors (conductor end portions) 201-224 thereon will extend through the horizontal plane containing the water level line 250 and interface 24 between the water layer 20 and the liquid hydrocarbon 22 in the tank 10 when the detector 14 is reinserted into the tank 10.

Then the operator again lowers the leak detector 14 back into the tank 10 to the bottom 16 thereof so that the leak detector 14 is resting firmly on the bottom 16 of the tank 10. Then conductivity can be detected using a conventional conductivity meter, ohm meter or volt meter.

In one embodiment shown in FIG. 9, a display panel 254 can be utilized which will indicate the position of the interface relative to the inclined lower edge 126 of the plate assembly 124. This is accomplished by the electrical circuits 30 shown in FIG. 10. Each circuit 30 includes one of the conductors 100 and the sensor end portion thereof, such as the conductor end portion 201. Each circuit 30 also includes the liquid between the sensor (e.g., sensor 201) and the grounded plate 128, decreases.

Each of the circuits 30 can be energized by batteries so that the leak detector has a self-contained power supply.

As noted above, FIG. 9 illustrates a leak detector system 300 including the leak detector 14, the control panel 254 and the optional microprocessor 280. The control panel is shown with two rows of sixteen (16) lamps, although as noted above preferably one row or column of twenty-four (24) lamps are preferred. Also, the control panel 254 is shown with the conductivity meter 282 mounted thereon together with a calibration control knob 302. These items can be eliminated, if desired. Also an ON and OFF switch 304 can be provided for energizing the control panel 254.

Further, it will be understood that all monitoring can be effected solely with the microprocessor which can be programmed to poll the inputs thereof connected to the sensors 201-224 periodically, such as once every hour. Then, of course, any changes in conductivity over any number of the sensors or bare end portions 201-224 can be correlated with the distance H, the distance L, the angle $\theta$ and the time elapsed to determine the rate of leakage.

It should be noted that the sensitivity of the array of sensors can be altered by changing the angle $\theta$, the angle of inclination of the lower edge 126 of the plate assembly 124 to the horizontal.

From empirical tests, it appears that a preferred angle for the angle $\theta$ is 20°.

In FIG. 8 there is illustrated a modified embodiment of a sensor assembly 322 including a plate assembly 324 wherein the plate assembly 324 is adapted to be rotated about an axis perpendicular to the plate assembly 324 so as to alter the angle $\theta$. In this assembly, a lower edge 326 of the plate assembly 324 is perpendicular to the side edges of the plate assembly 324. In this embodiment, the sensors 330 are thermal sensors each of which extends an equal distance from the edge 326. The sensitivity of this array of sensors is adjusted by rotating the plate assembly 324 so as to change the angle of the lower edge 326 relative to the horizontal. This will result in a change in the distance H measured vertically between the exposed ends of adjacent sensors of the plurality 330 of sensors.

In a thermal system, the same voltage is applied to each sensor 330 and the liquid medium will determine how much heat is dissipated by each sensor and the rate of heat dissipation. This will determine a given steady state current. Then when the liquid medium is changed, such as from petroleum product to water, the heat dissipation will change causing a change in the steady state current. This change in current is measured to determine a change in the water level.

Preferably, the exposed end portions 201-224 of the sensing conductors 100 are "tinned", i.e., coated with an anti-corrosive metal, such as silver, gold or tin.

In FIG. 11 there is illustrated an alternative embodiment of a leak detector assembly 414 of the present invention where, instead of having a rotatable plate assembly 324 as shown in FIG. 8 which lies in a generally vertical plane and is rotated in that plane, the modified leak detector 414 shown in FIG. 11 includes a plate assembly 426 which also lies in a vertical plane but which is rotatable about an axis lying in or parallel to the plane of the plate assembly 424. Here a plurality 430 of insulated wire conductors are mounted on one side of the plate assembly 424 and when the plate assembly 424 is rotated, the relative vertical distance between adjacent bare end portions of the insulated wire conductors 430 is changed in a manner similar to rotating the plate assembly 324 in FIG. 8 as described above.

It will be appreciated that in the embodiment shown in FIG. 7, the sensitivity is fixed whereas in the embodiment shown in FIGS. 8 and 11, the sensitivity of the array of sensors can be altered.

Further it will be appreciated that the frustoconical skirt or flange 64 provides a deflecting baffle for deflecting any debris at the interface 24 between the liquid 22 and the water 20 away from the ports 71-74 when the leak detector 14 is lowered into the tank 10. Additionally, in case any of this debris should gain access to the interior of the cylindrical casing 38, the tubing member 235 for washing or flushing the inclined lower edge 126 of the plate assembly 124 enables the sensors 201-224 to be washed or cleaned.

Extensive testing of the leak detector was conducted at an Amoco facility in Casper, Wyo. and produced surprisingly good results.

For example, leak tests for a tank with gasoline (tank No. 325) and a tank for light fuel oil (tank No. 322) maximum leak rates of 15 gal./hr and 10 gal./hr were detected using a leak detector constructed according to the above teachings. Accuracy of the detector is verified by determining the leak rate while drawing water from the tank using the detector and comparing that determined rate with the actual measured rate of water drained off from the tank.

Figure 12:
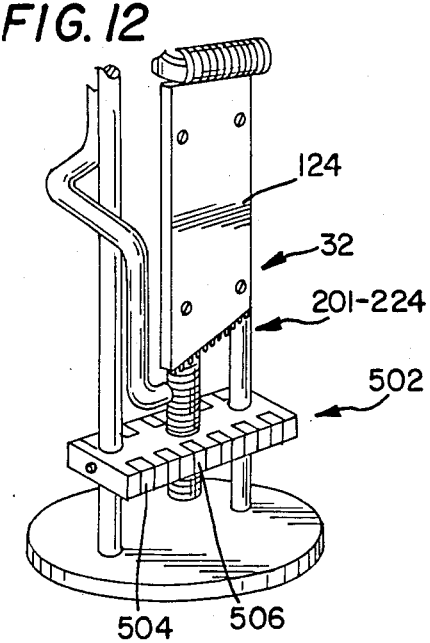
FIG. 12 is a fragmentary perspective view of a portion of the sensor assembly of the leak detector shown in FIG. 2 and shows a magnet device located beneath the array of sensors, in position to be located just below liquid inlet port openings in the casing of the leak detector.

In FIG. 12 there is shown a magnet device 502 having a number of magnets 504 and 506 therein defining a plurality of magnetic poles. The magnet device 502 replaces the guide block (screw bearing block) 118 shown in FIG. 2 and is located beneath the sensor assembly 32. The magnet device 502 is also preferably located just below the inlet port openings 71-74 in position to trap fine particles of steel or rusted steel entering the sensing area via the port openings 71-74 and which otherwise might migrate to the wire conductor ends 201-224 defining the conductivity sensors and foul (short) the sensors 201-224.

Figure 13:
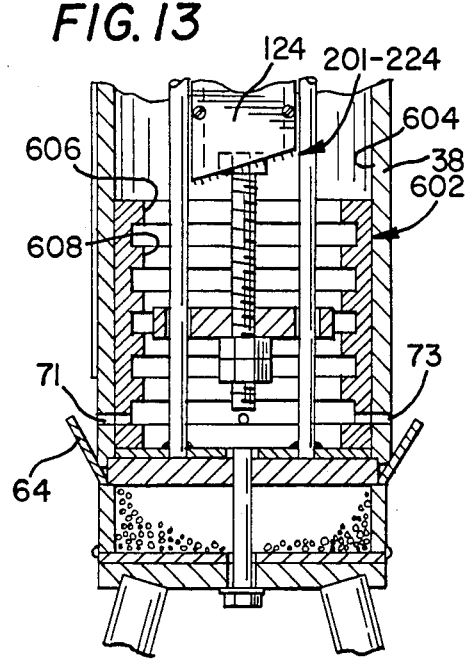
FIG. 13 is a fragmentary vertical sectional view of a portion of the leak detector shown in FIG. 3 and shows a cylindrical shell magnet crenelated on the interior surface of the cylindrical casing of the leak detector.

FIG. 13 shows a cylindrical shell magnet 602 crenelated on the interior surface 604 of the casing 38 with alternating pole magnets 606 and 608. Steel or rusted steel particles entering the port openings 71-74 with the liquid (water) in the tank 10 would be trapped by the series of pole magnets 606 and 608 as they moved upward with the liquid flow stream.

Figure 14:
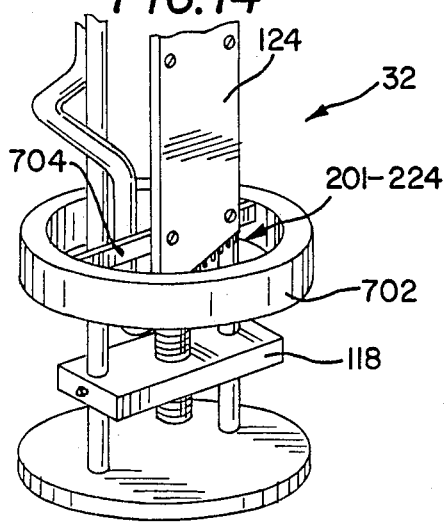
FIG. 14 is a fragmentary perspective view of the sensor assembly shown in FIG. 2 and shows a ring magnet encircling the conductivity electrodes of the sensor assembly.

FIG. 14 shows a ring magnet 702 surrounding the sensor wire conductor ends 201-224 located at the bottom of the sensor assembly 32. The ring magnet 702 may be held in place by a bracket or bar 704 fixed to and between the ring magnet 702 and to the sensor plate assembly 124. Steel or rusted steel particles would be directly removed from the interface by this ring magnet 702.

Figure 15:
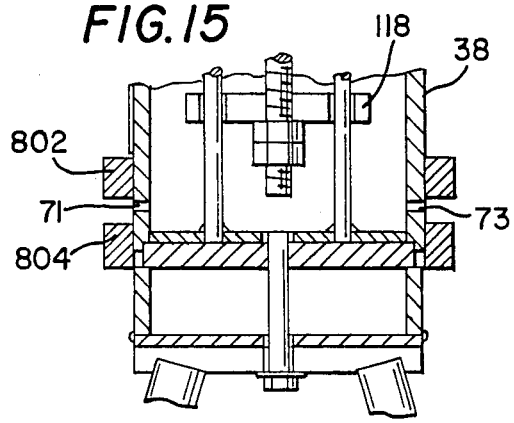
FIG. 15 is a fragmentary vertical sectional view through a modified lower portion of the leak detector shown in FIG. 3 and shows externally mounted ring magnets which are located above and below port openings through the casing of the leak detector.

In FIG. 15 two externally mounted ring magnets 802 and 804, positioned, respectively, above and below the port openings 71-74 are fixed to outer wall 806 of the casing 38. Steel and oxidized steel particles are trapped on these rings 802 and 804 before they enter the conductivity measuring area at the interface inside the casing 38. In this embodiment, the baffle 64 is omitted.

Figure 16:
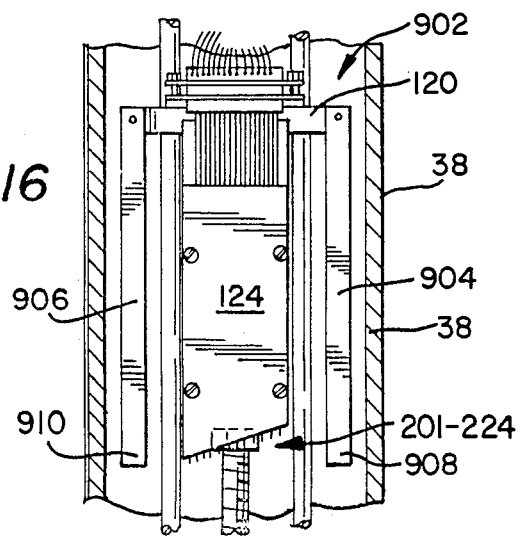
FIG. 16 is a fragmentary vertical sectional view of a portion of the leak detector shown in FIG. 3 and shows two bar magnets fixed to and depending from an upper part of the sensor assembly.

FIG. 16 shows a bar magnet assembly 902 installed inside the casing 38 of the leak detector 14. The bar magnet assembly 902 includes two elongate bar magnets 904 and 906 which are fixed to, and depend from, the block 120, such that the lower tips 908 and 910 of the bar magnets 904 and 906 will always be at or near to the hydrocarbon/water interface in the casing 38. In this embodiment, particles are swept out of the interface by the magnets 904 and 906.

From the foregoing description, it will be apparent that the method of the present invention for collecting magnetic metal contaminants using a magnetic contaminant collector as defined by the various magnet assemblies shown in FIGS. 12-16 has a number of advantages, some of which have been described above and others of which are inherent in the invention.

For example, the method can be used separately or in conjunction with a leak detector for preventing fouling of the conductivity sensors of the leak detector with steel or rusted steel particles.

Also it will be apparent from the foregoing description that various modifications can be made to the magnetic contaminant collector assemblies defined herein without departing from the teachings of the invention. Accordingly, the scope of the invention is only to be limited as necessitated by the accompanying claims.

We claim:

1. A method for determining the presence of a leak in an above ground tank of liquid hydrocarbons having a lower specific gravity and a lower conductivity than water, said method comprising the steps of:
   determining the level of water in said tank;
   collecting magnetizable particles in the liquid and water in the tank to prevent such magnetizable particles from fouling conductivity sensors utilized in sensing changes in the level of water in the tank;
   sensing changes in the level of water in the tank over time by sensing changes in conductivity at points along a line extending across an interface between the liquid hydrocarbons and the water in the tank; and,
   determining the amount and rate of leakage relative to the capacity of the tank and the change in the level of the water in the tank over a selected time period.

2. A method for determining the presence of a leak in an above ground tank of liquid hydrocarbon having a lower specific gravity and a lower conductivity than water, said method comprising the steps of:
   determining the level of water in the tank;
   collecting magnetizable particles in the liquid and water in the tank to prevent such magnetizable particles from fouling conductivity sensors utilized in sensing changes in the level of water in the tank;
   sensing changes in the level of water in the tank including the step of providing an array of sensors along a line inclined to the horizontal and placing said line of sensors across the interface between the liquid and the water in the tank; and
   determining the amount and rate of leakage relative to the capacity of the tank and the change in the level of the water in the tank over a selected time period.

3. A method for determining the presence of a leak in an above ground tank of liquid hydrocarbon having a lower specific gravity and a lower conductivity than water, said method comprising the steps of:
   determining the level of water in the tank;
   collecting magnetizable particles the liquid and water in the tank to prevent such magnetizable particles from fouling conductivity sensors utilized in sensing changes in the level of water in the tank;
   sensing changes in the level of water in the tank over time including providing an array of sensors along a line inclined to the horizontal and placing said line of sensors across an interface between the liquid and the water in the tank;
   periodically washing or flushing the array of sensors; and
   determining the amount and rate of leakage relative to the capacity of the tank and the change in the level of the water in the tank over a selected time period.

4. A method for determining the presence of a leak in an above ground tank of liquid hydrocarbons having a lower specific gravity and a lower conductivity than water, said method comprising the steps of:
   determining the level of water in said tank including providing a generally vertical layer of water sensitive material on the outer surface of a casing;
   lowering said casing having an array of sensors therein into said tank and allowing said casing to rest on the bottom of the tank for a short period of time; raising the casing out of the tank;
   noting where a water level line is established by the change in color of that portion of the layer which was situated in the water;
   collecting magnetizable particles in the liquid and water in the area of the tank where changes in the level of water in the tank are sensed;
   sensing changes in the level of water in the tank over time; and,
   determining the amount and rate of leakage relative to the capacity of the tank and the change in the level of the water in the tank over a selected time period.

5. A method for determining the presence of a leak in an above ground tank of liquid hydrocarbons having a lower specific gravity and a lower conductivity than water, said method comprising the steps of:
   determining the level of water in said tank;
   collecting magnetizable particles in the liquid and water in the tank to prevent such magnetizable particles from fouling conductivity sensors utilized in sensing changes in the level of water in the tank;
   sensing changes in the level of water in the tank by sensing changes in conductivity at points along a line extending across an interface between the liquid hydrocarbon and the water in the tank including monitoring the conductivity at discrete, spaced, vertical positions in the liquid just above the interface of liquid and water and in the water just below the interface and noting changes in conductivity at those positions over time; and
   determining the amount and rate of leakage relative to the capacity of the tank and the change in the level of the water in the tank over a selected time period.

6. A method for determining the presence of a leak in an above ground tank of liquid hydrocarbons having a lower specific gravity and a lower conductivity than water, said method comprising the steps of:
   determining the level of water in said tank;
   collecting magnetizable particles in the liquid and water in the tank to prevent such magnetizable particles from fouling conductivity sensors utilized in sensing changes in the level of water in the tank;
   sensing changes in the level of water in the tank by sensing changes in conductivity at points along a line extending across an interface between the liquid hydrocarbons and the water in the tank including monitoring the thermal conductivity (heat dissipation) at discrete, spaced, vertical positions in the liquid just above the interface of liquid and water and in the water just below the interface and noting changes in conductivity at those positions over time; and
   determining the amount and rate of leakage relative to the capacity of the tank and the change in the level of the water in the tank over a selected time period.

7. A method for determining the presence of a leak in an above ground tank of liquid hydrocarbons having a lower specific gravity and a lower conductivity than water, said method comprising the steps of:

introducing an amount of water into the tank sufficient to cover the bottom of the tank sufficient to enable a determination of water level in the tank to be made;

determining the level of water in said tank;

collecting magnetizable particles in the liquid and water in the tank to prevent such magnetizable particles from fouling conductivity sensors utilized in sensing changes in the level of water in the tank;

sensing changes in the level of water in the tank over time; and determining the amount and rate of leakage relative to the capacity of the tank and the change in the level of the water in the tank over a selected time period.

8. A method for determining the presence of a leak in an above ground tank of liquid hydrocarbons having a lower specific gravity and a lower conductivity than water, said method comprising the steps of:

determining the level of water in said tank;

collecting magnetizable particles in the liquid and water in the tank to prevent such magnetizable particles from fouling conductivity sensors utilized in sensing changes in the level of water in the tank;

sensing changes in the level of water in the tank over time; determining the amount and rate of leakage relative to the capacity of the tank and the change in the level of the water in the tank over a selected time period;

drawing water from the tank at a known rate; and repeating the above steps to verify the leak rate determinations made.

9. In a method for detecting leaks in an above ground storage tank by sensing changes in conductivity along a line intersecting an interface between the liquid product in the tank and water in the tank with a leak detector, the step of collecting magnetic metal contaminants to prevent magnetizable particles from fouling the sensing of changes of conductivity, 10. The method of claim 9 wherein said collecting step includes placing a magnet just below the area where changes in conductivity are sensed.

11. The method of claim 10 wherein said collecting step includes placing a cylindrical shell of magnets on the interior surface of a casing of the leak detector.

12. The method of claim 10 wherein said collecting step includes placing a ring magnet around the area where charges in conductivity are sensed.

13. The method of claim 9 wherein said collecting step includes placing a first ring magnet mounted around a casing of the leak detector above an inlet port opening through the casing and placing a second ring magnet around the casing and below the inlet port opening through the casing.

14. The method of claim 9 wherein said collecting step includes placing a bar magnet assembly including first and second spaced apart bar magnets such that the lower tip of each magnet is at or near the interface between the liquid and the water in the tank and in the area where changes in conductivity are sensed.

* * * * *

UNITED STATES PATENT OFFICE
CERTIFICATE OF CORRECTION

Patent No. 4,813,277  Dated March 21, 1989

Inventor(s) David C. Miller and Arthur R. Brown

It is certified that error appears in the above-identified patent and that said Letters Patent is hereby corrected as shown below:

| Patent Column | Line | |
|---|---|---|
| Abstract | 1 | "detecing" should read --detecting-- |
| 3 | 16 | "withdraws" should read --withdrawn-- |
| 3 | 24 | "110" should read --10-- |
| 12 | 10 | "," (comma) should read --.-- (period) |
| 12 | 19 | "charges" should read --changes-- |

Signed and Sealed this

Nineteenth Day of June, 1990

Attest:

HARRY F. MANBECK, JR.

Attesting Officer

Commissioner of Patents and Trademarks